Figure 1:
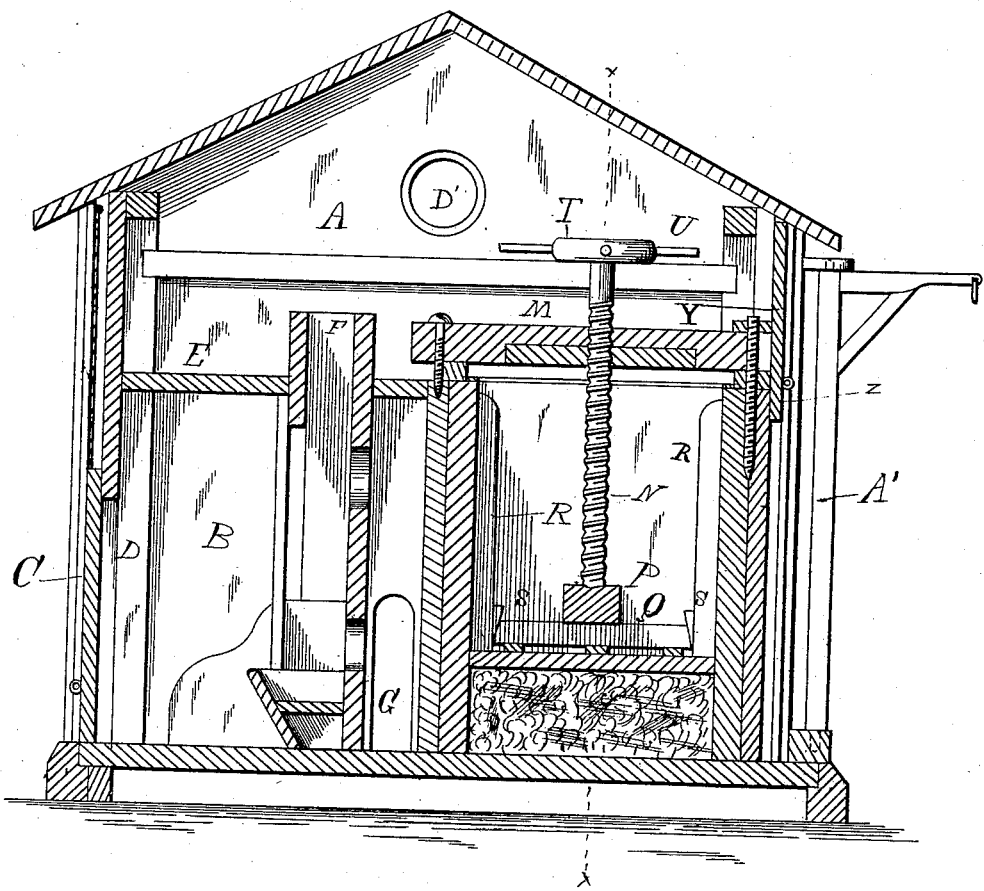

(No Model.)

2 Sheets—Sheet 1.

J. H. THORP.
PRESERVATION OF FOOD FOR CATTLE.

No. 266,923.

Patented Oct. 31, 1882.

Witnesses.
Edwin L. Yewell.
J. J. McCarthy.

Inventor.
James H. Thorp,
By E. M. Alexander.
his Attorney.

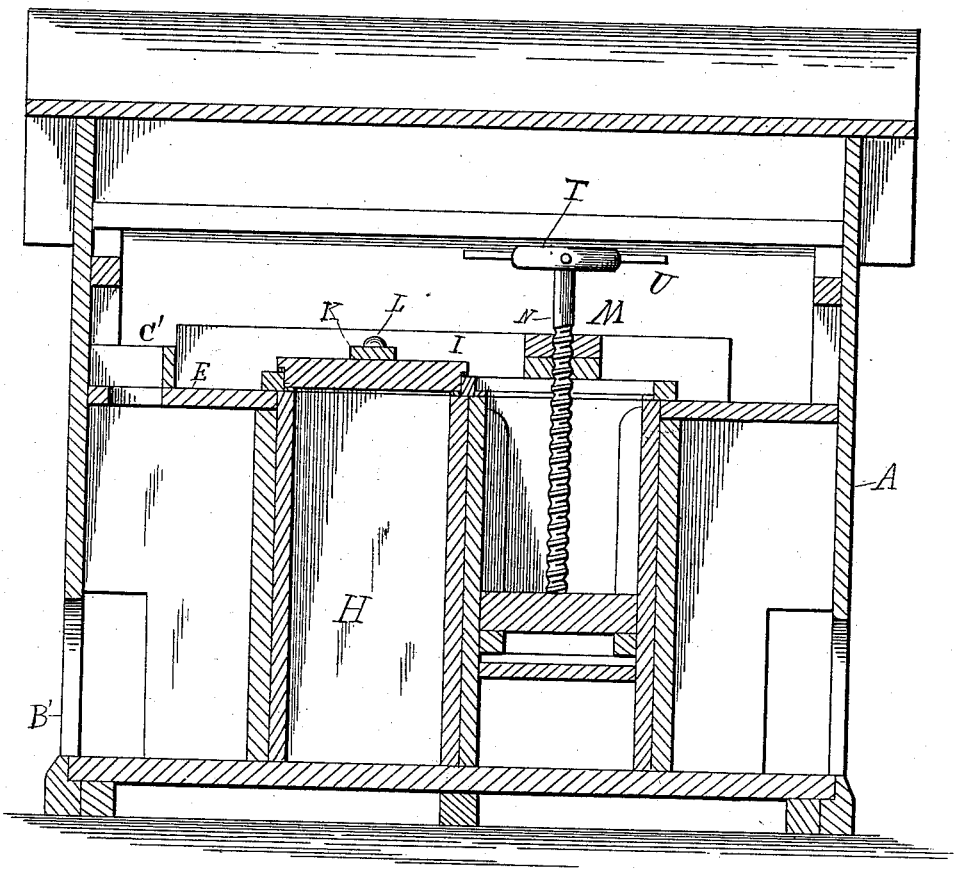

UNITED STATES PATENT OFFICE.

JAMES H. THORP, OF BALTIMORE, MARYLAND.

PRESERVATION OF FOOD FOR CATTLE.

SPECIFICATION forming part of Letters Patent No. 266,923, dated October 31, 1882.

Application filed October 7, 1882. (No model.)

*To all whom it may concern:*

Be it known that I, JAMES H. THORP, of Baltimore, in the county of Baltimore, and in the State of Maryland, have invented certain new and useful Improvements in the Preservation of Food for Cattle; and I do hereby declare that the following is a full, clear, and exact description thereof, reference being had to the accompanying drawings, and to the letters of reference marked thereon, making a part of this specification.

This invention relates to certain improvements in the preservation of food for cattle, in a green state, for use during the winter by the method of "ensilage." In the preservation of fodder by this method it has been customary to pack it in silos. These have generally consisted of pit-holes dug in the ground in some dry place where water will not penetrate, the material to be preserved being generally laid upon the bare earth and covered with boards and earth until required for use. The defect in such silos is that they do not thoroughly exclude the air, permitting the oxygen of the air to cause the usual decomposition to a certain extent and injuring the fodder.

The object of my invention is to remedy these defects and provide a structure in which the green food may be packed and stored secure from all atmospheric influences, as more fully hereinafter specified. These objects I attain by the means illustrated in the accompanying drawings, in which—

Figure 1 represents a transverse vertical section of my invention, and Fig. 2 a longitudinal vertical sectional view thereof.

The letter A indicates the outer walls of the structure, which may be built wholly of wood or other suitable material, but which are built preferably partly of natural or artificial stone, as more fully hereinafter set forth. At one side the structure is provided with a compartment, B, having a series of stalls for cattle, and sliding doors C, sliding in sashes D, being provided with cords and counter-balances, so that they will remain in position when elevated. The building is provided with a horizontal partition, E, leaving a compartment above for workmen. The stalls have passages F extending up into the upper compartment, through which the fodder may be supplied from above, as may be required.

The letter G indicates a driveway extending through the structure at the rear of the stalls, through which a wagon or other vehicle may be driven to collect and carry off débris.

The letter H indicates the silos, any number of which may be employed. These are located back of the driveway, and are constructed of any suitable material, but preferably of a composition which I call "puzzolene," and which I will hereinafter more fully describe. These silos are in the form of rectangular chambers, and are provided with covers I, having rubber gaskets and cross-bars K and confining-screws L, by means of which they may be hermetically closed when filled with fodder. In order to pack the fodder into the silos or chambers, I provide a cross-bar, M, having a packing-screw, N, the lower end of which bears against a beam, P, which sets against a follower, Q, adapted to move between ways R, by means of which the fodder may be packed into the chambers, the follower being clamped from time to time, as successive layers of fodder are charged in the same, by means of wedges S, as indicated in Fig. 1 of the drawings. The packing-screw at its upper end is provided with a hand-wheel, T, by means of which it may be operated, the said wheel having apertures at its periphery, into which may be inserted levers U to apply the proper power to the screw. The bar carrying the screw is constructed similar to the bars for confining the tops, so that it may be applied to any of the chambers for packing. At the rear of the silos or chambers is an opening, V, provided with a counterbalanced door, Y, sliding in sashes Z, and back of said opening is located a crane, A', which is provided with an elevating-rope, by means of which the fodder may be hoisted and deposited in the chambers.

The letter B' indicates doorways leading into the lower part of the structure, and C' an opening through which access may be had to the upper portion of the building, and D' openings for the escape of foul air to secure proper ventilation.

In building my improved structure I form the lower portion of the walls generally by laying successive courses of puzzolene in molds consisting of parallel boards suitably supported, until a proper height is reached, forming the superstructure of wood or other suitable material. The silos or chambers I form altogether of the puzzolene in the same manner.

The compound or puzzolene consists of the following ingredients, which are combined as hereinafter specified, viz: kaolin, ten pounds; plaster-of-paris, twenty pounds; soapstone, ten pounds; jute, one pound; caustic alkali, six ounces; litharge, four pounds; green copperas, ten pounds; carbolic acid, one pint; liquor ammoniæ, one pint; dextrine or other gummy substance, ten pounds.

In preparing the composition I first make a solution, in one hundred gallons of water, of the caustic alkali, copperas, carbolic acid, ammonia, and dextrine, in the proportions named, and then mix the other ingredients therewith, forming the puzzolene, which is built up as before mentioned, forming the walls of the structure. This compound sets and hardens quickly, forming an impervious wall of great durability and strength.

Having thus described my invention, what I claim, and desire to secure by Letters Patent, is—

1. The combination, in a structure or building for preserving fodder in a green state, of a series of silos opening into the upper chamber of said structure, a series of stalls communicating with said upper chamber by means of suitable passages, and the detachable tops and packing device to be used in connection with the silos, substantially as specified.

2. In combination with the silos, the interchangeable tops and packing device adapted to be secured to the silos, substantially as and for the purposes specified.

3. In combination with the silos and the stalls, the driveway located between the same, substantially as and for the purposes specified.

4. In combination with the silos or chambers, the crane and elevating mechanism adapted to work through a suitable door for filling the silos or chambers, substantially as set forth.

In testimony whereof I affix my signature, in presence of two witnesses, this 7th day of October, 1882.

JAMES H. THORP.

Witnesses:
J. J. McCARTHY,
H. J. ENNIS.